Nov. 29, 1955  S. C. PEPLIN  2,725,242
COMBINED HAND DRAWN CART AND BICYCLE TRAILER
Filed April 30, 1954  2 Sheets-Sheet 1

*INVENTOR.*
STEPHEN C. PEPLIN
BY Frank H. Harmon
ATTORNEY

Nov. 29, 1955  S. C. PEPLIN  2,725,242
COMBINED HAND DRAWN CART AND BICYCLE TRAILER
Filed April 30, 1954  2 Sheets-Sheet 2
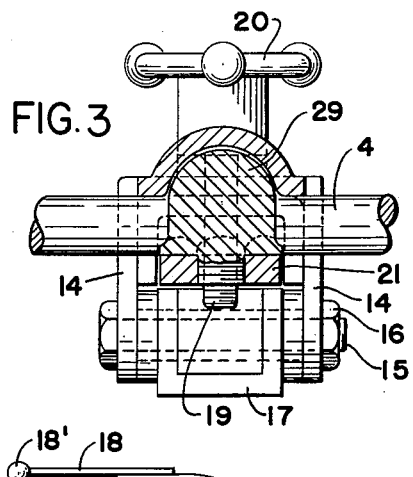
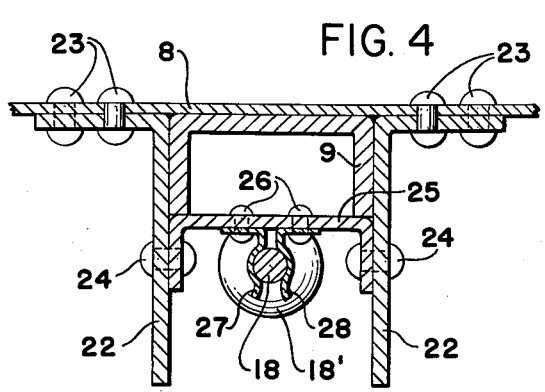
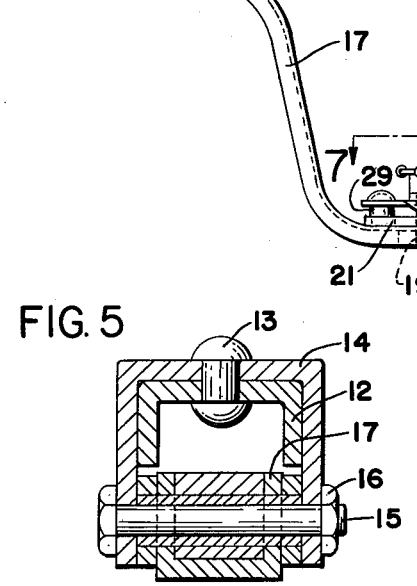
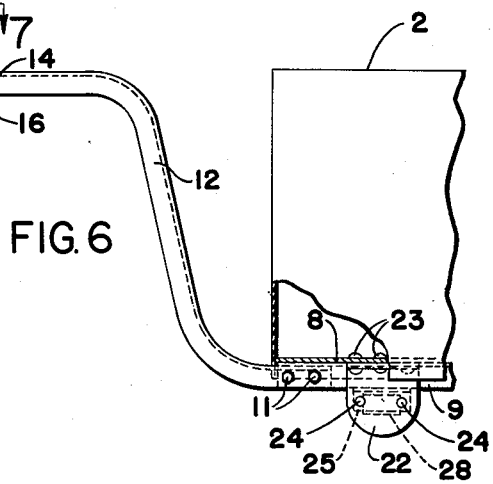
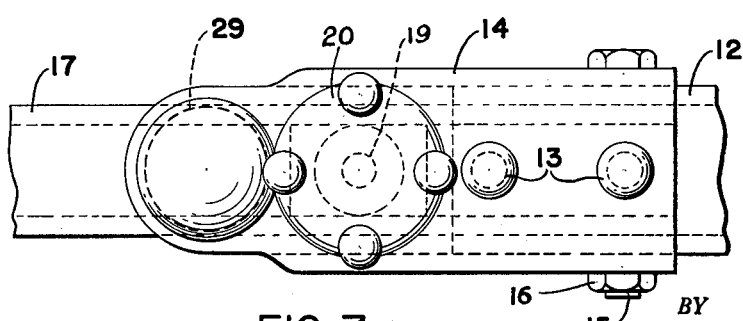
INVENTOR.
STEPHEN C. PEPLIN
BY
Frank H. Harmon
ATTORNEY

United States Patent Office 2,725,242
Patented Nov. 29, 1955

2,725,242

COMBINED HAND DRAWN CART AND BICYCLE TRAILER

Stephen C. Peplin, Lakewood, Ohio, assignor to Lakewood Manufacturing Company, Westlake, Ohio, a corporation of Ohio Application April 30, 1954, Serial No. 426,701

5 Claims. (Cl. 280—204)

This invention relates in general to vehicles and more particularly to improvements in combined hand drawn carts and bicycle trailers.

One of the primary objects of the invention is to provide a cart that has incorporated therein a forwardly extending channel beam that is equipped with a self-contained attachment unit that is capable of quick attachment to and detachment from the conventional framework bar of a bicycle to form a proper swivel connection for the trailer to the bicycle.

Another object is to provide a tongue pivotally secured to the channel beam of the cart that is foldable within the channel beam to a position under the cart and resiliently held out of the way when the cart is connected to the bicycle as a trailer.

A further object is to provide such an attachment unit in which the same hand operated means may be employed for locking the tongue in a forwardly extended position for convenient position for pulling the cart by hand when the cart is detached from the bicycle.

With the foregoing and other objects in view, the invention resides in the combination of parts and in the details of construction hereinafter set forth in the following specification and appended claims, certain embodiments thereof being illustrated in the accompanying drawings, in which:

Figure 3 is a view in section taken along line 3—3 of Figure 2;

Figure 4 is a view in section taken along line 4—4 of Figure 2;

Figure 5 is a view in section taken along line 5—5 of Figure 2;

Figure 6 is a view in side elevation of the cart and channel beam disconnected from the bicycle and the tongue locked in extended position; and Figure 7 is a top plan view of the locking unit taken along line 7—7 of Figure 6.

Figure 1:
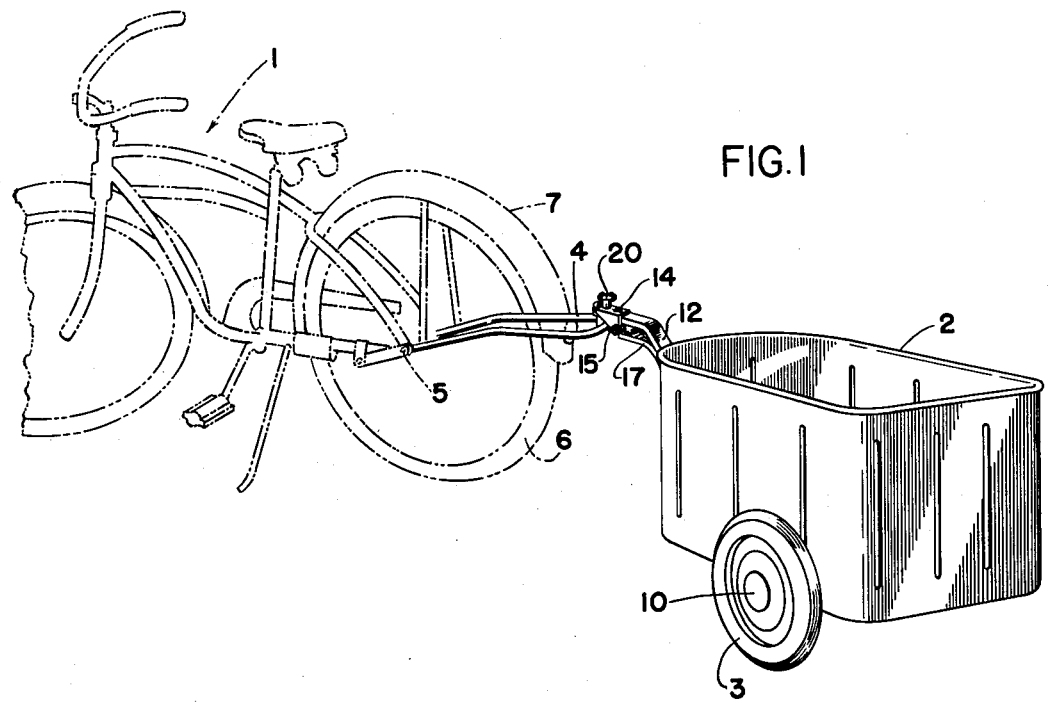
Figure 1 is a view in side elevational perspective of the cart connected as a trailer to a bicycle.

Referring more particularly to the drawings, there is generally shown at 1 a conventional bicycle and at 2 a cart having two axle borne supporting wheels 3. As is conventional practice, the framework of the bicycle includes a loop bar 4 with its ends secured to the axle 5 of the rear wheel 6 and the loop extends rearwardly past the rear wheel and mud guard 7. One of the features of the invention is that the quick attachment unit for the cart trailer is such that makes it adaptable for use as a trailer for such conventional bicycle framework construction, as will be explained in further detail.

Suitably secured to the floor 8 of the cart is a channel frame 9 for providing a support for the single axle 10 for the two cart wheels 3. Riveted at 11 to the two side walls of channel 9 is a gooseneck 12 with an underside channel. Near the forward end of gooseneck, or channel beam, 12, is riveted at 13 a collar 14, to which latter is pivotally secured by bolt 15 and nut 16 the rear end of a flat metal gooseneck 17, to which may be secured an extension 18 and a hand grip knob 18' to act as a wagon tongue, when the cart is detached from the bicycle.

Reference to Figure 6 shows the assembly when the cart is detached from the bicycle and employed as a hand drawn cart, instead of a bicycle trailer. The locking unit is carried by the collar 14. The collar 14 also carries a screw bolt 19 and a convenient hand knob 20. The bolt 19 is shown extending downwardly through an adjustable plate 21 between the adjacent ends of beam 12 and tongue 17 and through a screw threaded hole in tongue 17 to secure the tongue in the position shown in Figure 6 to adapt the cart to be employed as a hand drawn cart.

Figure 2:
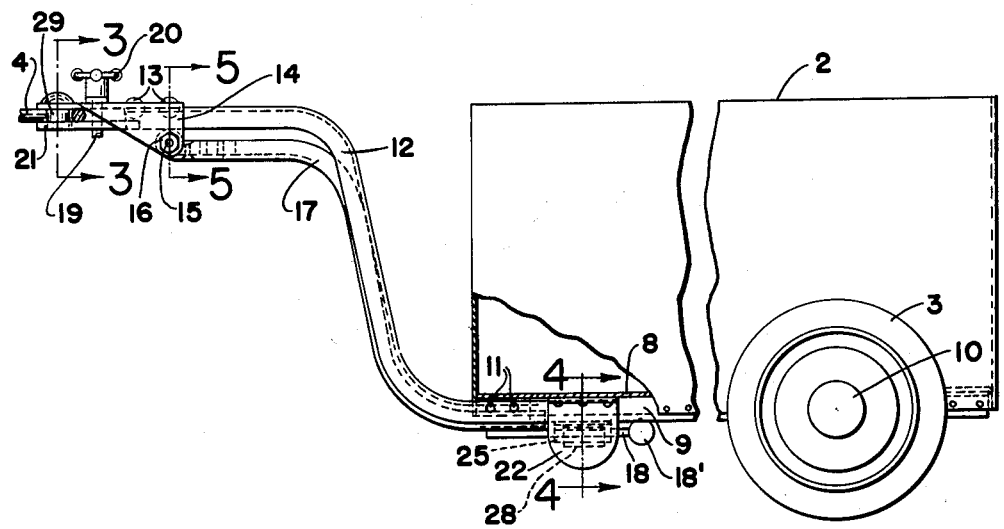
Figure 2 is a view in side elevation of the cart, partly broken away to show the tongue folded back within the channel beam and releasably held therein and under the body of the cart and showing the attachment unit of the beam pivotally secured to the bicycle framework bar.

When it is desired to attach the cart to the bicycle to employ the cart as a bicycle trailer, the hand knob 20 is turned to loosen the bolt out of engagement with tongue 17. Tongue 17 is then manually turned counter-clockwise about its pivot 15 from its position of Figure 6 to that of Figure 2. In doing so, the flat bar metal tongue 17 fits within the side walls of channel gooseneck 12. In addition, there are provided a pair of side ears 22 secured by rivets 23 to the cart floor 8 to support, by rivet connection 24 a bracket 25. Bracket 25 has secured thereto by rivets 26 a pair of leaf springs 27 and 28. In moving the tongue all the way back under the floor of the cart, the tongue extension 18 is forced between the springs 27 and 28 to resiliently maintain the tongue out of the way.

Near its forward end, the collar 14 carries a post 29 that is not secured to under plate 21. When bolt 19 is manually loosened, the loop 4 of the bicycle frame work is manually positioned to encircle post 29 between the top plate of collar 14 and plate 21. Tightening of the same bolt 19 by the same hand knob 20 that is employed to secure the hand tongue 17 in the position shown in Figure 6, is now employed to secure the gooseneck 12 to the loop 4 of the bicycle framework to provide a swivel connection about post 29 as a vertical pivot.

From the foregoing, it will be seen that there has been provided a new and novel combined hand drawn cart and bicycle trailer that is easily and readily convertible, one into the other, and which includes a self-contained locking unit for quick attachment to, and detachment from, the conventional bicycle frame while the hand drawing tongue is detachably secured to the cart and out of sight, as well as out of the way, and in which the same hand knob used for clamping the cart to the bicycle is employed for clamping the tongue in position for pulling the cart by hand.

I claim:

1. In a combined hand drawn cart and bicycle trailer adapted to be detachably connected to the framework of a bicycle, a beam secured to said cart to extend forwardly thereof, a clamping unit carried adjacent the forward end of said beam and including a collar to which is pivotally secured a tongue foldable about its pivot to constitute an extension in a direction forwardly of said beam for hand engagement and hand pulling of said cart, said clamping unit also including manually operable means for clamping said tongue to said collar, said tongue, after being manually released from said clamp unit, being foldable about its pivot in a rearward direction to lie in a retracted position, said clamping unit also including a post carried by said collar to engage a part of the bicycle framework to constitute a vertical pivot swivel connection between the beam of the cart and the bicycle, the same manual clamping means constituting the means for clamping said beam in swivel relationship with the bicycle framework.

2. In a combined hand drawn cart and bicycle trailer adapted to be detachably connected to the framework of a bicycle, a beam secured to said cart to extend forwardly thereof, a clamping unit carried adjacent the forward end of said beam and including a collar to which is pivotally secured a tongue foldable about its pivot to constitute an extension in a direction forwardly of said beam for hand engagement and hand pulling of said cart, said clamping unit also including manually operable means for clamping said tongue to said collar, said tongue, after being manually released from said clamp unit, being foldable about its pivot in a rearward direction to lie in a retracted position and a resilient clip on the trailer for releasably holding said tongue in said retracted position, said clamping unit also including a post carried by said collar to engage a part of the bicycle framework to constitute a vertical pivot swivel connection between the beam of said cart and the bicycle, the same manual clamping means constituting the means for clamping said beam in swivel relationship with the bicycle framework.

3. In a combined hand drawn cart and bicycle trailer adapted to be detachably connected to the framework of a bicycle, a channel beam secured to said cart to extend forwardly thereof, a self-contained clamping unit carried adjacent the forward end of said beam and including a collar to which is pivotally secured a tongue foldable about its pivot to constitute an extension in a direction forwardly of said beam for hand engagement and hand pulling of said cart, said clamping unit also including manually operable means for clamping said tongue to said collar, said tongue, after being manually released from said clamp unit, being foldable about its pivot in a rearward direction to lie within the channel beam to extend under the cart and a spring clip on the trailer for releasably holding said tongue in said retracted position, said clamping unit also including a post carried by said collar to engage a part of the bicycle framework to constitute a vertical pivot swivel connection between the channel beam of said cart and the bicycle, the same manual clamping means constituting the means for clamping the channel beam in swivel relationship with the bicycle framework.

4. In a combined hand drawn cart and bicycle trailer adapted to be detachably connected to the framework of a bicycle, a beam secured to said cart to extend forwardly thereof, a self-contained clamping unit carried adjacent the forward end of said beam and including a collar to which is pivotally secured a tongue foldable about its pivot to constitute an extension in a direction forwardly of said beam for hand engagement and hand pulling of said cart, said clamping unit also including a plate and a screw bolt manually turnable by a hand knob for clamping said tongue to the collar and plate, said tongue, after being manually released from said clamp unit, being foldable about its pivot in a rearward direction to lie in a retracted position and a spring clip on the trailer for releasably holding said tongue in said retracted position, said clamping unit also including a post carried by said collar to engage a part of the bicycle framework to constitute a vertical pivot swivel connection between the channel beam of said cart and the bicycle, the same manual knob actuated bolt and plate, constituting the means for clamping the channel beam in swivel relationship with the bicycle framework.

5. In a combined hand drawn cart and bicycle trailer adapted to be detachably connected to the framework of a bicycle, a channel beam secured to said cart to extend forwardly thereof, a self-contained clamping unit carried adjacent the forward end of said beam and including a collar to which is pivotally secured a tongue foldable about its pivot to constitute an extension in a direction forwardly of said beam for hand engagement and hand pulling of said cart, said clamping unit also including a plate and a screw bolt manually turnable by a hand knob for clamping said tongue to the collar and plate, said tongue, after being manually released from said clamp unit, being foldable about its pivot in a rearward direction to lie in a retracted position within the channel beam to extend under the cart and a spring clip on the trailer for releasably holding the end of said tongue in said retracted position, said clamping unit also including a post carried by said collar to engage a part of the bicycle framework to constitute a vertical pivot swivel connection between the channel beam of said cart and the bicycle, the same manual knob actuated bolt and plate, constituting the means for clamping the channel beam in swivel relationship with the bicycle framework.

References Cited in the file of this patent

FOREIGN PATENTS

| | | |
|---|---|---|
| 1,020,007 | France | Nov. 12, 1952 |
| 400,834 | Great Britain | Nov. 2, 1933 |